United States Patent
McWhorter et al.

(10) Patent No.: US 7,083,022 B2
(45) Date of Patent: Aug. 1, 2006

(54) MOTORCYCLE DRIVE TRAIN

(75) Inventors: Cory McWhorter, Saint Cloud, MN (US); Todd Sigfrid, Brooklyn Park, MN (US)

(73) Assignee: Viper Motorcycle Company, Hopkins, MN (US)

( * ) Notice: Subject to any disclaimer, the term of this patent is extended or adjusted under 35 U.S.C. 154(b) by 0 days.

(21) Appl. No.: 10/824,188

(22) Filed: Apr. 14, 2004

(65) Prior Publication Data
US 2005/0230169 A1    Oct. 20, 2005

(51) Int. Cl.
*B62K 11/00*    (2006.01)
(52) U.S. Cl. .................. 180/227; 180/218; 180/219; 180/226; 180/228; 180/231; 474/94; 474/195; 474/196; 474/903
(58) Field of Classification Search ............. 180/218, 180/219, 227, 228, 231, 226; 474/94, 195, 474/196, 903
See application file for complete search history.

(56) References Cited

U.S. PATENT DOCUMENTS

| | | | |
|---|---|---|---|
| 3,257,860 A * | 6/1966 | Runde et al. ............ 474/94 |
| 4,328,879 A * | 5/1982 | Tone ...................... 180/219 |
| 4,356,877 A * | 11/1982 | Kamiya .................. 180/227 |
| 4,374,549 A * | 2/1983 | Lacroix .................. 180/207 |
| 4,567,958 A * | 2/1986 | Ishihara .................. 180/230 |
| 4,648,359 A * | 3/1987 | Ito ....................... 123/90.31 |
| 4,754,833 A * | 7/1988 | Kawashima ............ 180/219 |
| 4,794,998 A * | 1/1989 | Iwai et al. .............. 180/219 |
| 5,378,199 A * | 1/1995 | Chyi-Shiun ............... 474/8 |
| 5,531,289 A * | 7/1996 | Muramatsu .............. 180/227 |
| 2005/0006163 A1* | 1/2005 | Brendelson et al. ...... 180/227 |

* cited by examiner

*Primary Examiner*—Lesley D. Morris
*Assistant Examiner*—Marlon Arce-Diaz
(74) *Attorney, Agent, or Firm*—Schwegman, Lundberg, Woessner & Kluth, P.A.

(57) ABSTRACT

A motorcycle is described which has a frame and a rear wheel attached to a driven pulley. A drive pulley is rotatably mounted to a rigid bracket attached to the frame such that a relative orientation between the drive pulley and the driven pulley is maintained substantially constant. A drive belt is coupled to the drive pulley and the driven pulley such that a rotation of the drive pulley imparts a rotation of the driven pulley. A transmission output gear is attached to an output of a transmission, and a drive coupler is provided as an interface between the transmission output gear and the drive pulley.

15 Claims, 6 Drawing Sheets

MOTORCYCLE DRIVE TRAIN

FIELD OF THE INVENTION

The present invention relates to motorcycle drive trains. More particularly the present invention relates to drive trains having a belt or chain drive.

BACKGROUND OF THE INVENTION

Most motorcycles are powered by an engine coupled to a drive mechanism through a transmission. The transmission features a variety of gear ratios that can be selectively engaged during operation. The output of the transmission, in turn, drives a drive pulley that is coupled to a driven pulley attached to a rear wheel. A flexible drive member, such as a belt or chain for instance, preferably extends between the two pulleys.

The engine and transmission can be attached to a frame of the motorcycle by either rigid couplings or flexible couplings. While the rigid coupling technique provides a more definite placement between the drive train components during operation, the vibration transferred from the motor to a user is often excessive. As such, the flexible couplings, for example rubber mountings, are preferred for user comfort. Unfortunately, the flexibility of the motor and transmission mounting can result in damage to the drive belt. That is, during periods of rapid acceleration and deceleration the alignment of the two belt pulleys changes dramatically. As known to those in the art, damage to the drive belt during operation can be dangerous to the motorcycle operator.

What is desired is a motorcycle drive train that has the benefits of vibration control via damping mounts and the drive belt reliability of rigid mounted systems.

BRIEF SUMMARY OF THE INVENTION

In one embodiment, a motorcycle comprises a frame and a rear wheel attached to a driven pulley. A drive pulley is rotatably mounted to a rigid bracket, wherein the rigid bracket is attached to the frame such that a relative orientation between the drive pulley and the driven pulley is maintained substantially constant. A drive belt is coupled to the drive pulley and the driven pulley such that a rotation of the drive pulley imparts a rotation of the driven pulley. A transmission output gear is attached to an output of a transmission, and a drive coupler is provided as an interface between the transmission output gear and the drive pulley.

In another embodiment, a motorcycle comprises a frame and a rear swing arm attached to the frame to allow the rear swing arm to pivot relative to the frame. The swing arm supports a rear wheel that is coupled to a driven pulley. A drive pulley is rotatably mounted to a bracket that is fixed to the frame such that a relative orientation between the drive pulley and the driven pulley is maintained through an operating pivot range of the swing arm. A drive belt is provided to couple the drive pulley and the driven pulley such that a rotation of the drive pulley imparts a rotation of the driven pulley. A transmission output gear is attached to an output of a transmission and a drive coupler provided an interface between the transmission output gear and the drive pulley. A clutch slave cylinder is attached to the transmission such that the bracket, drive pulley, drive coupler and output gear are located between the clutch slave cylinder and the transmission. The clutch slave cylinder helps to maintain the engagement of the drive coupler between the output gear and the drive pulley.

These and other features of the invention will be more apparent from the following detailed description that is provided in connection with the accompanying drawings and illustrated exemplary embodiments of the invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural changes may be made without departing from the present invention.

Figure 1A:
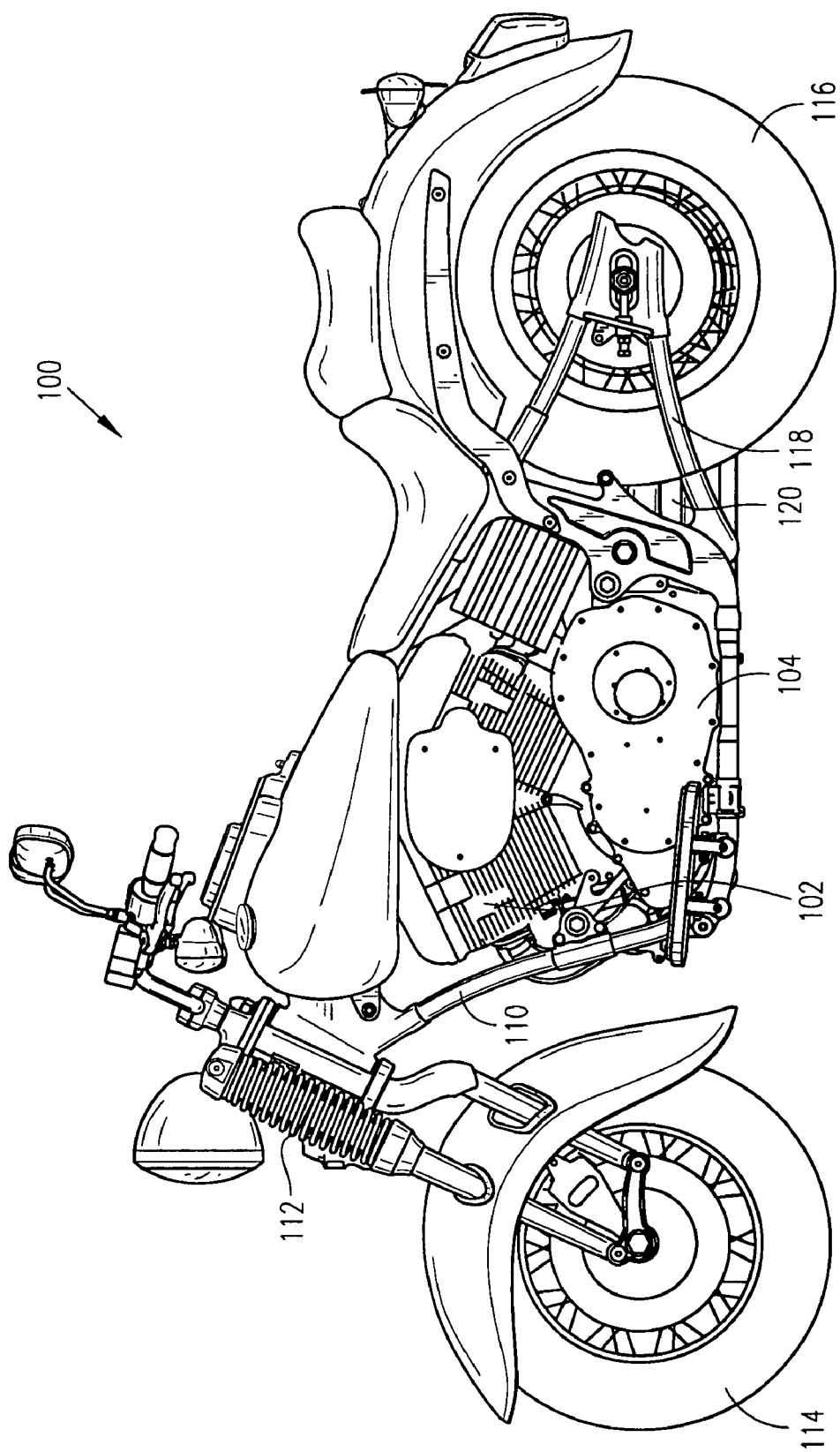
FIGS. 1A and 1B illustrate a motorcycle of an embodiment of the present invention.
Figure 1B:
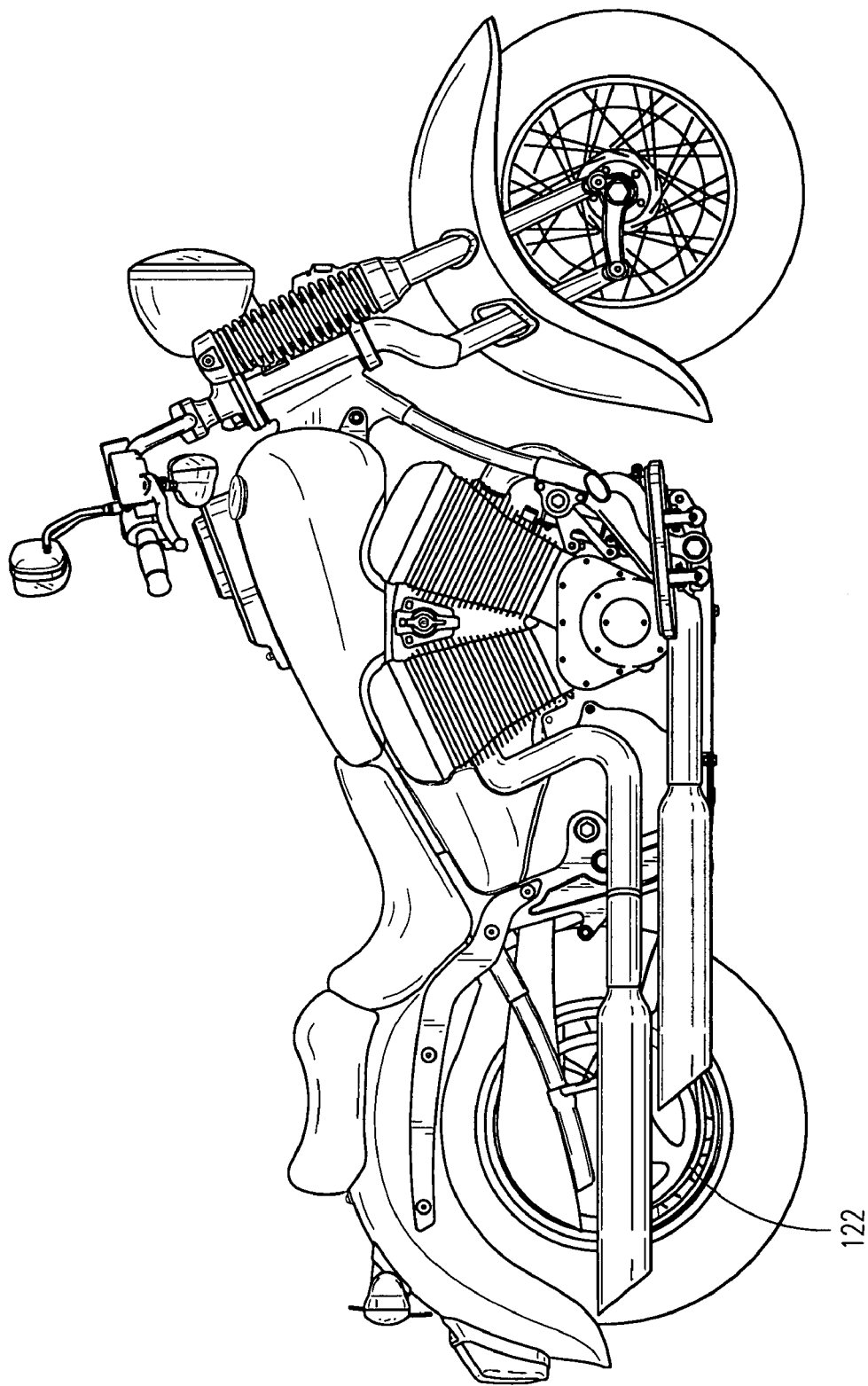

With reference initially to FIGS. 1A and 1B, a motorcycle 100 of one embodiment of the present invention is illustrated in side views. The motorcycle is powered by an engine 102 through a transmission 104 and drive train, which is constructed in accordance with embodiments of the present invention. As is known to those of ordinary skill in the art, the motorcycle is generally comprised of a frame 110 assembly upon which the engine is attached. This frame assembly also supports a front fork 112 to which a front wheel 114 is mounted. A rear wheel 116 is mounted to the frame 110 assembly in any suitable manner. The rear wheel is preferably attached to the frame assembly through the use of a rear swing arm 118. The illustrated rear swing arm is arranged to pivot relative to the frame assembly about a pivot shaft 120.

Figure 2:
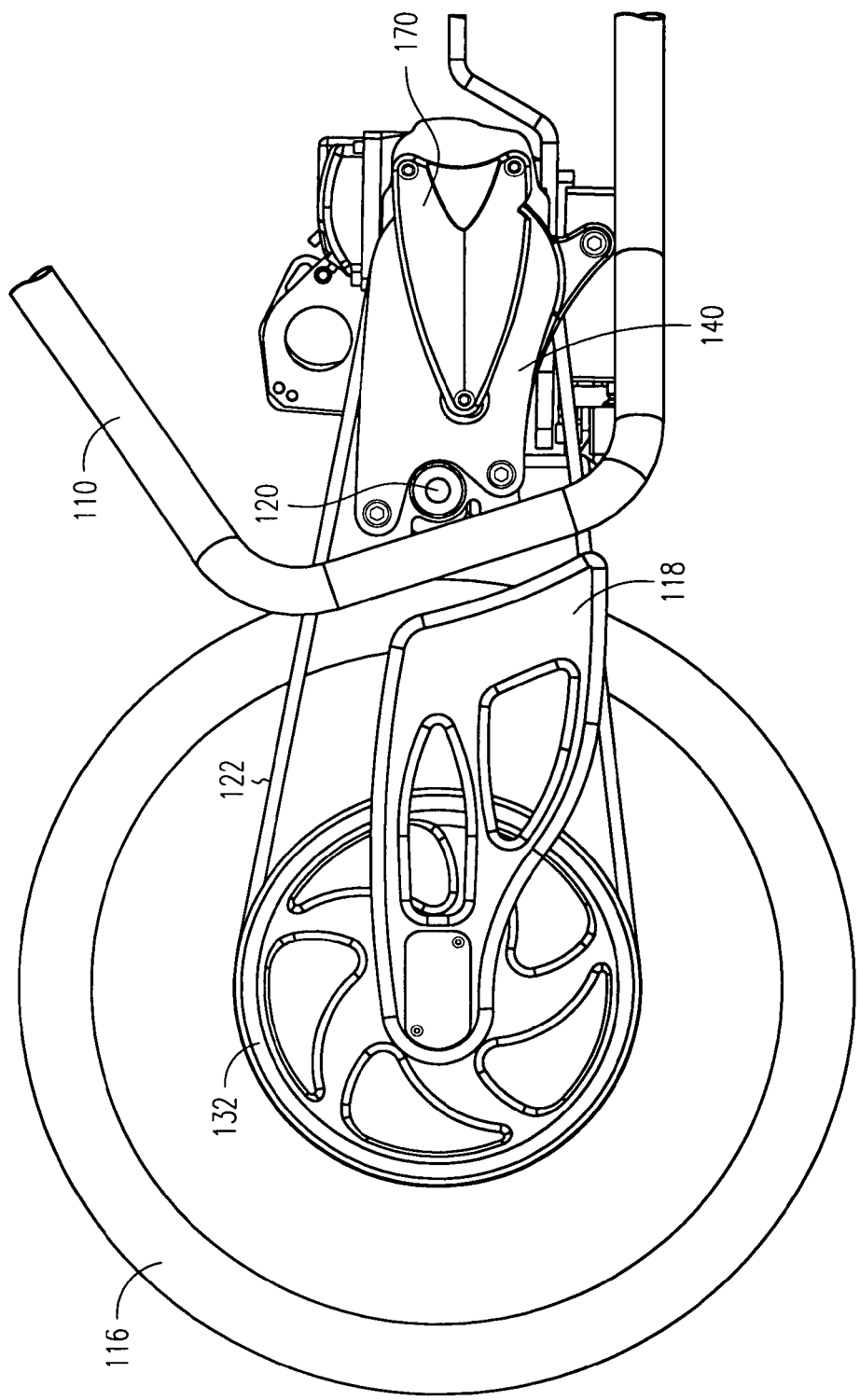
FIG. 2 is a simplified view of a portion of the drive train of the motorcycle of FIGS. 1A and 1B.

The illustrated rear wheel is driven by the transmission 104 through a final drive belt 122 as illustrated in the simplified drawing of FIG. 2. It will be appreciated that other flexible drive members, such as a chain, can be used to drive the rear wheel. The belt extends around a drive pulley 130 and a slave, or driven, pulley 132 attached to the rear wheel 116. A rigid bracket 140 that is attached to the motorcycle frame 110 preferably maintains the location of the drive pulley 130. As detailed below, the drive pulley is coupled to a transmission output shaft to allow movement by the engine and transmission relative to the frame without substantially changing the drive and driven pulley relative positioning. That is, the axis of the drive pulley remains substantially parallel to the driven pulley axis.

Figure 3:
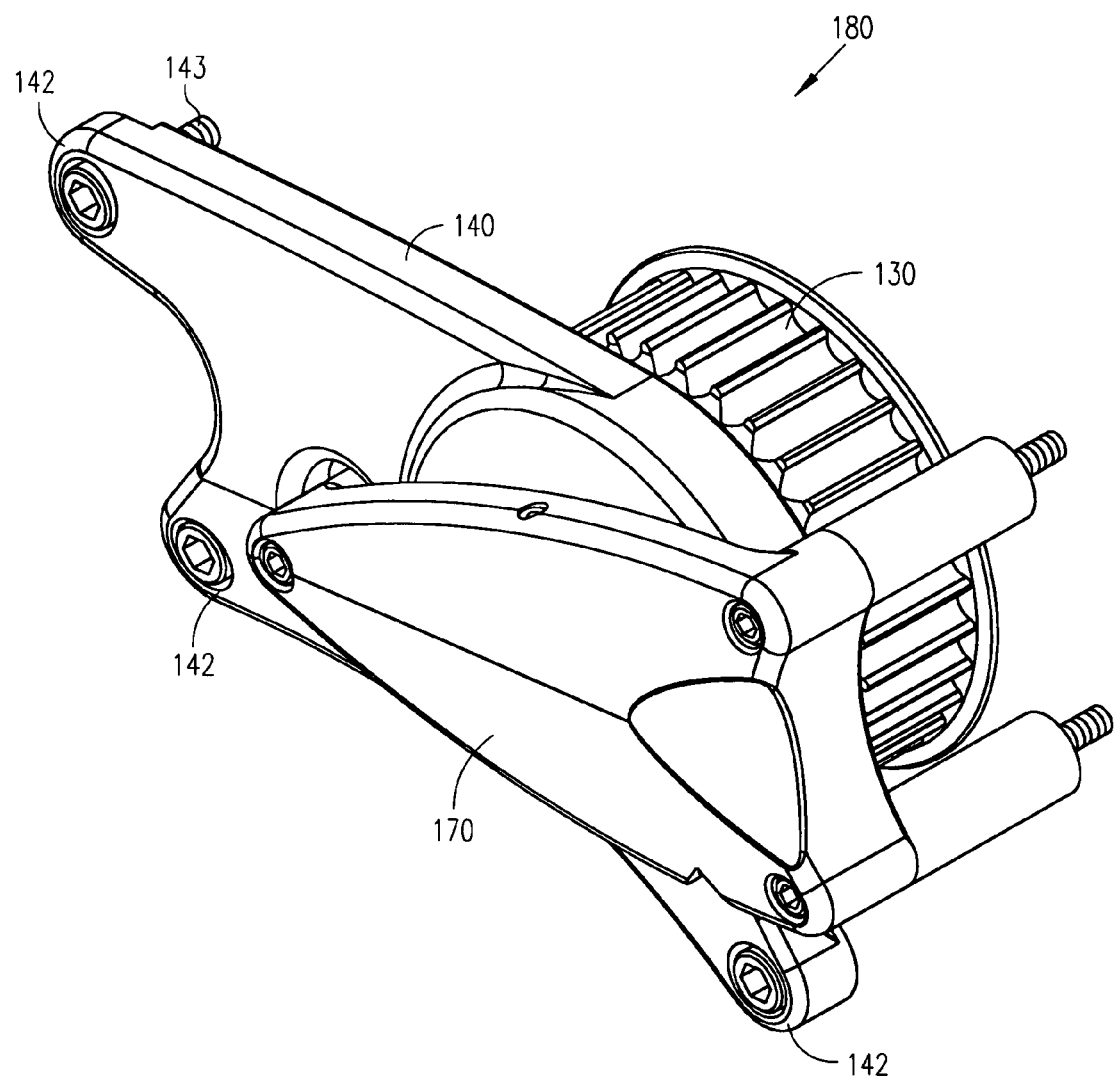
FIG. 3 is a perspective view of one embodiment of a drive pulley bracket.

Referring to FIG. 3, a perspective view of one embodiment of a drive pulley bracket 140 is illustrated. The bracket includes mounting locations 142 to rigidly attach to the motorcycle frame 110. In a preferred embodiment the bracket is attached to the frame using threaded fasteners 143. It will be understood that the term 'rigidly attached' is used herein to describe relative positions between the bracket and frame and should not be interpreted to mean the absence of any movement. For example, bushings could be used with the bracket to provide some isolation between the bracket and frame without allowing for any substantial relative movement.

The drive pulley 130 is coupled to the bracket 140 in a manner that fixes its axis and allows for rotational movement. A tension of the drive belt 122 (FIG. 2) not shown, is therefore maintained substantially constant during operation. The term pulley can be interchanged with the term gear to indicate a rotational device coupled to the drive belt or chain. In one embodiment, a second bracket 170 functioning as a clutch slave cylinder is provided to couple the transmission to the drive assembly.

Figure 4:
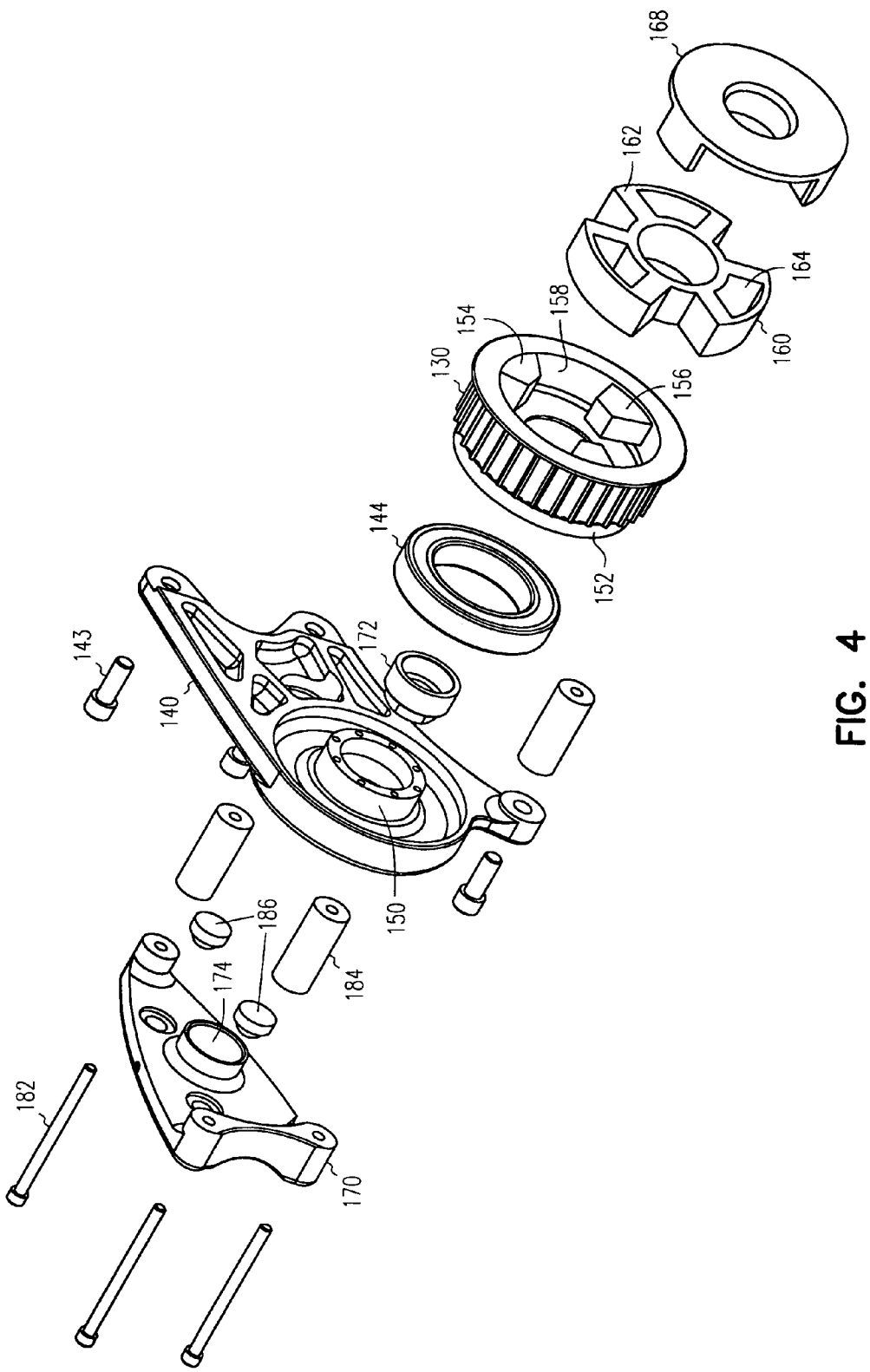
FIG. 4 is an exploded view of a drive pulley assembly.
Figure 5:
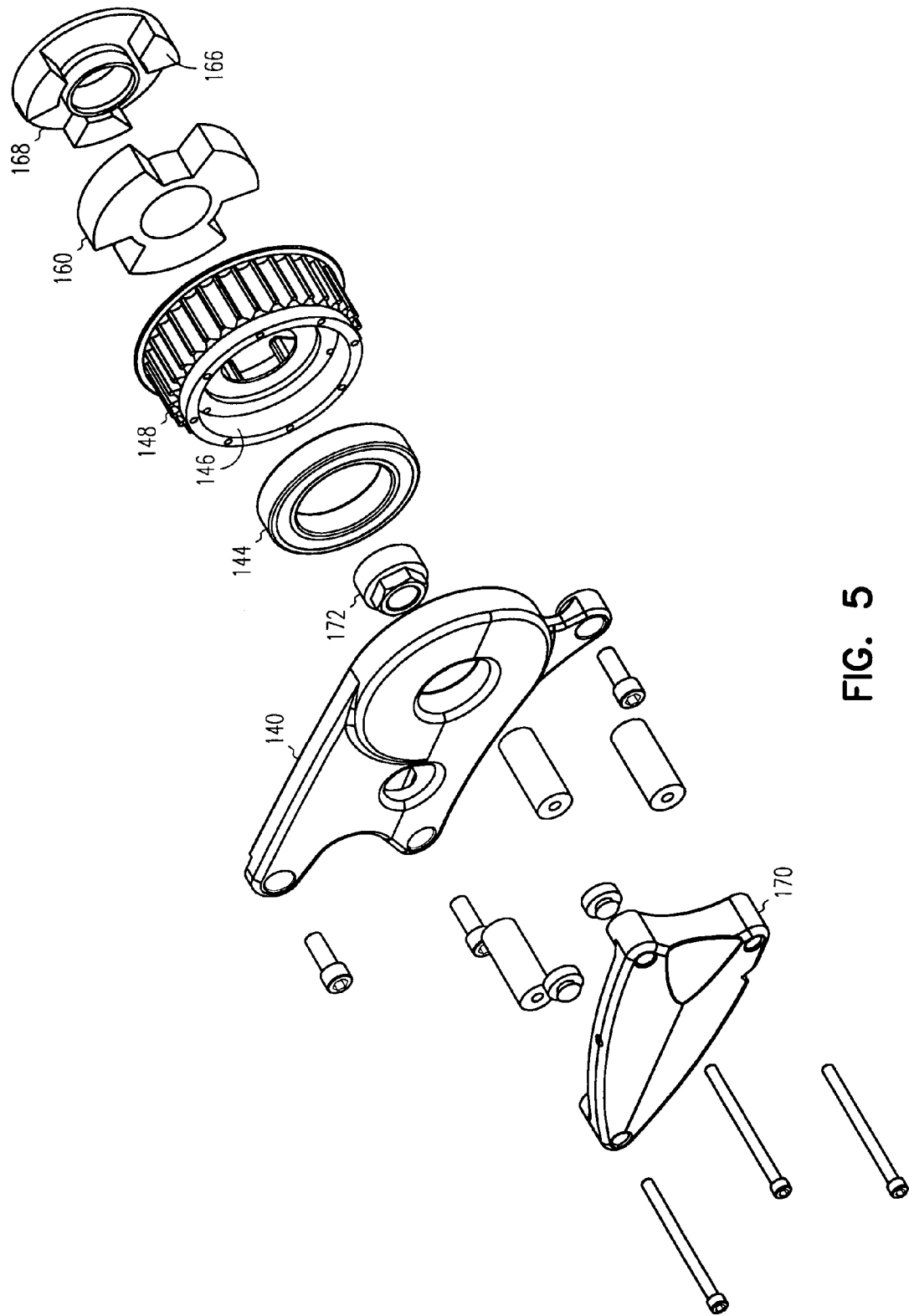
FIG. 5 is another exploded view of the drive pulley assembly.

FIGS. 4 and 5 provide exploded views of the drive assembly. The drive pulley 130 is coupled to the bracket 140 using a bearing 144. In one embodiment the outside diameter of the bearing is press-fit into an appropriately sized recess 146 provided in the pulley. The recess is provided on the outward side 148 of the pulley relative to the transmission location. The inside diameter of the bearing is either slip-fit or press-fit over a standout 150 provided integral to the rigid bracket 140. It will be appreciated that numerous mounting configurations can be provided to fix the pulley axis relative to the mounting locations of the bracket while allowing the pulley to freely rotate about that axis. As such, the present invention is not limited to the bearing configuration illustrated.

The circumferential surface of the drive pulley includes teeth 152 to engage the drive belt. The number, shape and size of the pulley teeth can vary based upon the belt specifications and are not of particular relevance to the present invention. On the inward side 154 of the pulley 130, the pulley interior geometry includes a plurality of teeth 156 and slots 158 provided to engage a drive coupler 160. The drive coupler in one embodiment is press-fit into the pulley and is fabricated from a compression forgivable material such as rubber. In the illustrated embodiment the drive coupler includes three fingers 162 to engage the drive pulley. Other embodiments can include more fingers, such as six.

The drive coupler also includes a plurality of slots 164 sized to receive teeth 166 from a transmission output driver gear 168. The specific shapes of the output drive gear, drive coupler and drive pulley can be varied between embodiments. Thus, the present invention is not limited to the shapes illustrated. Further, it will be appreciated that the drive coupler can be fabricated from other materials, such as a nylon or plastic, suitable for coupling the drive pulley with transmission output gear. By using a resilient compressible material the drive coupler can absorb rotational slap between the drive pulley and the drive gear.

The transmission output drive gear 168, in the present illustration, is fixed to the transmission output shaft (not shown) via a nut 172. During manufacturing, the rigid bracket 140, bearing 144, drive pulley 130 and coupler 160 are assembled together to form a drive pulley assembly 180. This drive pulley assembly can then be attached to the frame 110. A clutch slave cylinder 170 is used to both hold the drive pulley assembly to the transmission and selectively operate a clutch.

The clutch slave cylinder 170 includes a piston cylinder 174 sized to receive a piston (not shown). A push rod, also not shown, passes through the drive pulley assembly 180, nut 172, output driver gear 168 and transmission 104 to control the transmission clutch. In operation the piston moves the push rod to disengage a pressure plate of the clutch, as known to those in the art. The clutch slave cylinder includes porting to move hydraulic fluid to the piston cylinder for operation. As known to those skilled in the art, fittings and a bleeder (not shown) are provided for the slave cylinder.

Multiple bolts 182 and stand-offs 184 are used to attach the clutch slave cylinder 170 to the transmission. In the illustrated embodiment two rubber stoppers 186 are sandwiched between the clutch slave cylinder 170 and the rigid bracket 140. This provides a compression force to hold the transmission 104 and drive pulley assembly 180 together. It will be appreciated by those skilled in the art with the benefit of the present description that the slave cylinder can be replaced with a bracket to hold the transmission and drive pulley assembly together. Thus, the clutch slave cylinder and push rod are accommodated for the illustrated embodiment but not necessary to all embodiments of the present invention.

The above-described motorcycle allows the drive pulley 130 and rear wheel driven pulley 132 to maintain their relative position while the engine and transmission are attached to the frame using vibration-reducing mountings (not shown). In an embodiment where the motorcycle drive system has high horsepower and high output torque the reliability and durability of the drive belt is improved while allowing the engine and transmission to move within the frame. It will be understood that the rear wheel moves in a slight arc motion as the swing arm pivots during operation. This arc movement results in the driven pulley axis moving in a relative arc and not fixed to the axis of the driven pulley. This movement is considered insubstantial to maintaining the relative orientation of the two pulleys per the present invention. The embodiments of the present invention prevent the drive pulley from twisting in a torsional manner to misalign the pulleys. Thus, the relative orientation of both pulleys remains substantially constant.

The above description and drawings are to be considered illustrative of exemplary embodiments that achieve the features and advantages of the invention. Although exemplary embodiments of the present invention have been described and illustrated herein, many modifications, even substitutions of materials, can be made without departing from the invention. It is not intended that the invention be limited to the embodiments shown and described in detail herein. The invention is limited only by the scope of the appended claims.

What is claimed is:

1. A motorcycle comprising:
   a frame;
   a rear wheel attached to a driven pulley;
   a drive pulley rotatably mounted to a rigid bracket separate from an output of a transmission, wherein the rigid bracket is attached to the frame such that a relative orientation between the drive pulley and the driven pulley is maintained substantially constant;
   a drive belt coupling the drive pulley and the driven pulley such that a rotation of the drive pulley imparts a rotation of the driven pulley;
   a transmission output gear attached to the output of the transmission; and
   a drive coupler located between, and coupled to both, the transmission output gear and the drive pulley.

2. The motorcycle of claim 1 wherein the drive coupler is fabricated from a resilient compressible material.

3. The motorcycle of claim 2 wherein the resilient compressible material comprises rubber.

4. The motorcycle of claim 1 wherein the drive pulley is rotatably mounted to the bracket via a bearing.

5. The motorcycle of claim 4 wherein the bearing is press-fit to both the bracket and the drive pulley.

6. The motorcycle of claim 1 wherein the drive pulley comprises a plurality of teeth to engage the drive coupler.

7. The motorcycle of claim 1 further comprising an engine, wherein both the engine and the transmission are attached to the frame using vibration absorbing mounting devices.

8. The motorcycle of claim 1 further comprising a clutch slave cylinder attached to the transmission, wherein the clutch slave cylinder is positioned to maintain the engagement of the drive coupler between the output gear and the drive pulley.

9. A motorcycle comprising:
a frame;
a rear swing arm attached to the frame to allow the rear swing arm to pivot relative to the frame, wherein the swing arm supports a rear wheel;
a driven pulley coupled to the rear wheel;
a drive pulley rotatably mounted to a bracket, wherein the bracket is fixed to the frame such that a relative orientation between the drive pulley and the driven pulley is maintained through an operating pivot range of the swing arm;
a drive belt coupling the drive pulley and the driven pulley such that a rotation of the drive pulley imparts a rotation of the driven pulley;
a transmission output gear attached to an output of a transmission;
a drive coupler located between, and coupled to both, the transmission output gear and the drive pulley;
a clutch slave cylinder attached to the transmission, wherein the bracket, drive pulley, drive coupler and output gear are located between the clutch slave cylinder and the transmission such that the clutch slave cylinder helps to maintain the engagement of the drive coupler between the output gear and the drive pulley.

10. The motorcycle of claim 9 wherein the drive coupler is fabricated from a resilient compressible material.

11. The motorcycle of claim 10 wherein the resilient compressible material comprises rubber.

12. The motorcycle of claim 9 wherein the drive pulley is rotatably mounted to the bracket via a bearing.

13. The motorcycle of claim 9 further comprising an engine, wherein both the engine and the transmission are attached to the frame using vibration absorbing mounting devices.

14. A motorcycle drive assembly comprising:
a drive pulley rotatably mounted to a bracket via a bearing, wherein the bracket is adapted to be attached to a frame of a motorcycle;
an output gear for attachment to an the output shaft of a transmission; and
a drive coupler located between, and coupled to both the output gear and the drive pulley, the drive coupler is fabricated from a resilient compressible material to absorb rotational slap between the drive pulley and the output gear.

15. The motorcycle drive assembly of claim 14 further comprising a clutch slave cylinder attachable to a transmission of the motorcycle, wherein the bracket, drive pulley, drive coupler and output gear are located between the clutch slave cylinder and the transmission such that the clutch slave cylinder helps to maintain the engagement of the drive coupler between the output gear and the drive pulley.

* * * * *